Dec. 20, 1955  F. W. MEREDITH  2,728,035
LIQUID CONTENTS GAUGES
Filed June 2, 1952

INVENTOR:
F. W. MEREDITH
ATTORNEYS:
Moore & Hall

�# United States Patent Office 2,728,035
Patented Dec. 20, 1955

2,728,035

LIQUID CONTENTS GAUGES

Frederick William Meredith, Cheltenham, England, assignor to Smiths America Corporation, Ruxton, Md.

Application June 2, 1952, Serial No. 291,362

8 Claims. (Cl. 317—246)

This invention relates to devices for indicating the quantity of liquid within a container which utilise, for the determination of that quantity, the variation in capacitance of a number of condensers within the space which may contain liquid, the dielectric of said condensers being constituted wholly or partially of liquid according to the quantity of liquid in the space, and the capacitance of the said condensers thus varying substantially linearly with the product of the volume of liquid and its dielectric constant. Such devices will be hereinafter referred to as "liquid contents indicators of the capacitance type." In such a device it is desirable to provide a reference condenser with which the capacitance of said condensers is compared, the dielectric of which is constituted by a sample of the fluid so that the system may be compensated for variations in dielectric constant; and in British specification No. 22,597/49 (United States specification No. 181,089/50) there is disclosed a device in which a floating reference condenser is utilised to provide compensation for variations in both dielectric constant and liquid density. Such a floating reference condenser has the disadvantage that upon motion of the whole system oscillation of the float with respect to the liquid results in irregular variation of the capacitance of the condenser with consequent irregular variation and uncertainty in the indication provided. It is accordingly the object of the present invention to provide a floating reference condenser whereby the indication of a liquid contents indicator of the capacitance type may be corrected for variations of both dielectric constant and liquid density and in which the foregoing disadvantage is counteracted.

According to the present invention we provide a floating reference condenser for a liquid contents indicator in which the space between the plates to be occupied by liquid communicates with the liquid by at least one restricted path, whereby variation of the level of liquid between the plates and consequent variation of capacitance is opposed.

Figure 1:
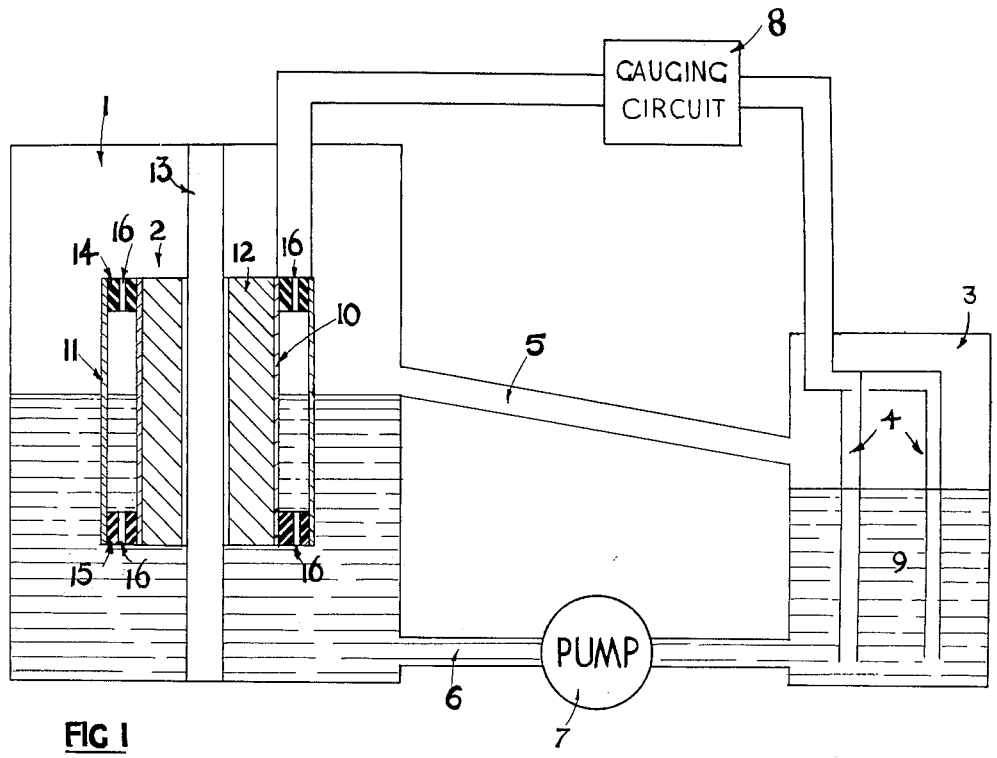

Embodiments of the invention will now be described with reference to the accompanying drawings, of which Figure 1 shows diagrammatically a liquid contents gauge incorporating a reference condenser in accordance with one form of the invention.

Figure 2:
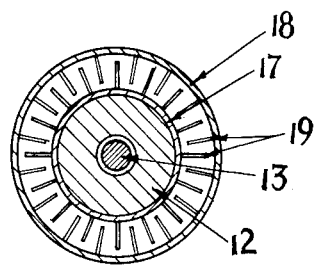

Figure 2 shows a section through a reference condenser in accordance with a second form of the invention.

Referring to Figure 1, the system there shown comprises a sample tank 1 containing a floating reference condenser 2, a main tank 3 having distributed through it a plurality of condensers such as 4, pipes 5 and 6 connecting the main tank 3 and sample tank 1, a pump 7 to ensure that the liquid in the sample tank 1 is representative of the liquid in the main tank 3 and a gauging circuit indicated at 8 to which condensers 2 and 4 are connected. The gauging circuit 8 is as described in the earlier-mentioned specification. The manner in which the whole system operates to give an indication of the mass of liquid 9 contained in the main tank 3 are fully described and discussed in that specification and will not be further discussed here.

The reference condenser 2 as shown in Figure 1 comprises inner and outer concentric conducting circular cylindrical members 10 and 11 which constitute the reference condenser plates. Inner member 10 is carried by a float 12 which is constrained to move substantially only in a vertical direction by means of a guide rod 13. Outer member 11 is located with respect to inner member 10 by means of annuluses 14 and 15 of insulating material, these being pierced with holes as at 16 to allow the liquid in tank 1 access to the space between members 10 and 11 of such a size that the liquid between the members is a representative sample of that in tank 1 but sufficiently small to prevent violent fluctuation of the level of the liquid between the members upon motion of the system.

In the alternative form of condenser constructed in accordance with the invention shown in plan in Figure 2 the float 2 has attached to it an inner member 17 and an outer member 18 located with respect to the inner member 17 by annuluses such as those shown at 14 and 15 in Figure 1. The members 17 and 18 are provided with interleaved fins, as at 19, which in addition to providing a higher capacitance for a given bulk than an arrangement such as shown in Figure 1 also have the effect of preventing violent fluctuations in level of liquid between the members upon motion of the system, the dimensions being such that nevertheless the liquid between the members is a representative sample of the liquid in the sample tank.

It will be appreciated that a reference condenser constructed in accordance with the present invention is particularly advantageous when used for example with a fuel contents gauge (such as that described in the earlier-mentioned specification) for use in aircraft.

I claim:

1. In a liquid contents indicator of the capacitance type, a reference condenser; comprising first and second members forming the plates of said condenser, float means, said float means being attached to and supporting said members so that a fraction of the dielectric of said condenser, dependent upon the liquid density, is constituted by any liquid by which the reference condenser is surrounded, and means attached to and disposed between said first and second members to define a restricted path allowing liquid to have access to the space between said first and second members.

2. In a liquid contents indicator of the capacitance type, a reference condenser comprising first and second cylindrical members forming the plates of said condenser, a cylindrical float means, said float means being attached to and supporting said members so that a portion of the space between said members and hence of the condenser dielectric dependent upon the liquid density, is constituted by any liquid by which the condenser is surrounded and at least one annular insulating member maintaining said cylindrical members in spaced relationship to each other, said annular insulating member having holes formed therein to provide a liquid flow path connecting the region surrounding the condenser and the space between said first and second members.

3. In a liquid contents indicator of the capacitance type, a reference condenser comprising first and second members forming the plates of said condenser, and float means, said float means being attached to and supporting said members so that a fraction of the dielectric of said condenser, dependent upon the liquid density, is constituted by any liquid by which the reference condenser is surrounded, said members being formed with interleaving portions disposed to restrict access of liquid to the space between them.

4. A condenser as claimed in claim 3 wherein the first and second members are each provided with interleaved fins to define said interleaving portions whereby the access of liquid is restricted.

5. In a liquid contents indicator of the capacitance type, a reference condenser comprising first and second spaced members forming the plates of said condenser, float means attached to and supporting said spaced members in a liquid medium so that a fraction of the dielectric of said condenser, dependent upon the density of said liquid medium, is constituted by a portion of the said liquid medium being interposed between said members, and means defining a restricted fluid flow path between said first and second members for opposing variation in the level of liquid between said members due to transient motion of said float means.

6. The device of claim 5 in which said first and second members comprise coaxial cylindrical conducting members of differing diameters, said means defining a restricted fluid flow path comprising at least one annulus of insulating material defining a restricted aperture therein and coupled to each of said members to maintain the said members in spaced relation, said float means being cylindrical in shape and being coupled to and disposed within the inner of said coaxial cylindrical members.

7. The device of claim 6 in which said reference condenser is constrained to motion in a single ordinate by a guide rod, said guide rod extending through a bore in said float means.

8. The device of claim 5 in which said first and second members comprise two concentric cylindrical members, said cylindrical members being of differing diameters and including means spacing them from one another to define a hollow-cylindrical volume therebetween, said means defining a restricted fluid flow path comprising a plurality of fins respectively coupled to each of said members and extending therefrom into said hollow-cylindrical volume, said float means being coupled to and disposed within the inner of said concentric cylindrical members.

References Cited in the file of this patent

UNITED STATES PATENTS

| 2,377,275 | Smith | May 29, 1945 |
| 2,416,808 | Weiss | Mar. 4, 1947 |
| 2,511,398 | De Giers | June 13, 1950 |
| 2,544,012 | Edelman | Mar. 6, 1951 |
| 2,629,068 | Gottschalk | Feb. 17, 1953 |

FOREIGN PATENTS

| 481,103 | Great Britain | Feb. 28, 1938 |
| 648,583 | Great Britain | Jan. 10, 1951 |

OTHER REFERENCES

Publication, "Airplane Fuel Gage," Electronics Magazine, vol. 23, No. 4, April 1950, pages 78, 79.